United States Patent
Jennas, II et al.

(10) Patent No.: US 8,578,108 B2
(45) Date of Patent: *Nov. 5, 2013

(54) DYNAMIC LOOK-AHEAD EXTENT MIGRATION FOR TIERED STORAGE ARCHITECTURES

(75) Inventors: Paul Anthony Jennas, II, Tucson, AZ (US); Larry Juarez, Tucson, AZ (US); David Montgomery, Tucson, AZ (US); Todd Charles Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 12/849,087

(22) Filed: Aug. 3, 2010

(65) Prior Publication Data

US 2012/0036327 A1 Feb. 9, 2012

(51) Int. Cl.
G06F 12/00 (2006.01)
(52) U.S. Cl.
USPC ........... 711/162; 711/161; 711/165; 711/170; 718/104; 707/639; 707/649
(58) Field of Classification Search
USPC .................. 711/161, 162, 165, 170; 718/104; 707/639, 649
See application file for complete search history.

(56) References Cited

U.S. PATENT DOCUMENTS

| | | | |
|---|---|---|---|
| 7,305,462 B2 * | 12/2007 | Nakamura et al. | 709/223 |
| 7,444,483 B2 | 10/2008 | Taguchi et al. | |
| 7,475,217 B2 * | 1/2009 | Abe et al. | 711/171 |
| 2004/0260862 A1 | 12/2004 | Anderson | |
| 2006/0236056 A1 | 10/2006 | Nagata | |
| 2007/0033368 A1 | 2/2007 | Taguchi et al. | |
| 2008/0168228 A1 | 7/2008 | Carr et al. | |
| 2008/0222218 A1 * | 9/2008 | Richards et al. | 707/204 |
| 2008/0313641 A1 | 12/2008 | Inoue et al. | |
| 2009/0276588 A1 | 11/2009 | Murase | |
| 2009/0292870 A1 | 11/2009 | Sambe et al. | |

* cited by examiner

*Primary Examiner* — Arpan P. Savla
(74) *Attorney, Agent, or Firm* — Nelson and Nelson; Daniel P. Nelson; Alexis V. Nelson

(57) ABSTRACT

A method for migrating extents between extent pools in a tiered storage architecture maintains a data access profile for an extent over a period of time. Using the data access profile, the method generates an extent profile graph that predicts data access rates for the extent into the future. The slope of the extent profile graph is calculated and used to determine whether the extent will reach a migration threshold within a specified "look-ahead" time. If so, the method calculates a migration window that allows the extent to be migrated prior to reaching the migration threshold. In certain embodiments, the method determines the overall performance impact on the source extent pool and destination extent pool during the migration window. If the overall performance impact is below a designated impact threshold, the method migrates the extent during the migration window. A corresponding apparatus and computer program product are also disclosed herein.

16 Claims, 7 Drawing Sheets

Extent Profile Graph

DYNAMIC LOOK-AHEAD EXTENT MIGRATION FOR TIERED STORAGE ARCHITECTURES

BACKGROUND

1. Field of the Invention

This invention relates to data migration, and more particularly to apparatus and methods for efficiently migrating extents in multi-tier storage architectures.

2. Background of the Invention

Tiered storage, also known as hierarchical storage, is a storage architecture typically containing high-cost and lost-cost storage media logically arranged into tiers. This architecture may be used to efficiently utilize high-cost and lost-cost storage media to provide a desired level of cost and performance. For example, certain high-speed storage devices, such as solid state drives, are faster and more expensive than storage devices such as hard disk drives, which are in turn faster and more expensive than magnetic tape drives or optical drives. While it may be desirable to store all data on faster storage devices such as solid state drives, this can be impractical and prohibitively expensive. Instead, tiered storage enables slower and less expensive storage devices to store the bulk of an enterprise's data. This data may then be moved or copied to faster storage devices when needed. This may enable faster devices to act as cache for slower devices.

Current implementations for migrating extents (i.e., contiguous areas of data storage) within tiered storage architectures typically address why and where extents need to be migrated to improve performance. However, the decision as to when to migrate extents is either not addressed or not given the attention it deserves. The timing associated with migrating extents has large implications on performance. For example, migrating extents when storage devices are processing large amounts of I/O can significantly reduce the storage devices' I/O performance. In certain cases, migrating extents at inopportune times can be self-defeating as the goal of the migration may be that of improving I/O performance.

In view of the foregoing, what are needed are apparatus and methods to more effectively address when to migrate extents between extent pools in a multi-tier storage architecture. Ideally, such apparatus and methods will minimize I/O performance degradation on extent pools that are either the source or destination for the migration.

SUMMARY

The invention has been developed in response to the present state of the art and, in particular, in response to the problems and needs in the art that have not yet been fully solved by currently available apparatus and methods. Accordingly, the invention has been developed to provide apparatus and method to efficiently migrate extents between extent pools in a tiered storage architecture. The features and advantages of the invention will become more fully apparent from the following description and appended claims, or may be learned by practice of the invention as set forth hereinafter.

Consistent with the foregoing, a method for efficiently migrating extents between extent pools in a tiered storage architecture is disclosed herein. In one embodiment, such a method includes maintaining a data access profile for an extent over a period of time. Using the data access profile, the method generates an extent profile graph that predicts data access rates for the extent into the future. The slope of the extent profile graph is calculated. Using the slope, the method determines whether the extent will reach a migration threshold within a specified "look-ahead" time. If so, the method calculates a migration window that allows the extent to be migrated from a source extent pool to a destination extent pool prior to reaching the migration threshold. In certain embodiments, the method determines the overall performance impact on the source extent pool and destination extent pool during the migration window. If the overall performance impact is below a designated impact threshold, the method migrates the extent during the migration window.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
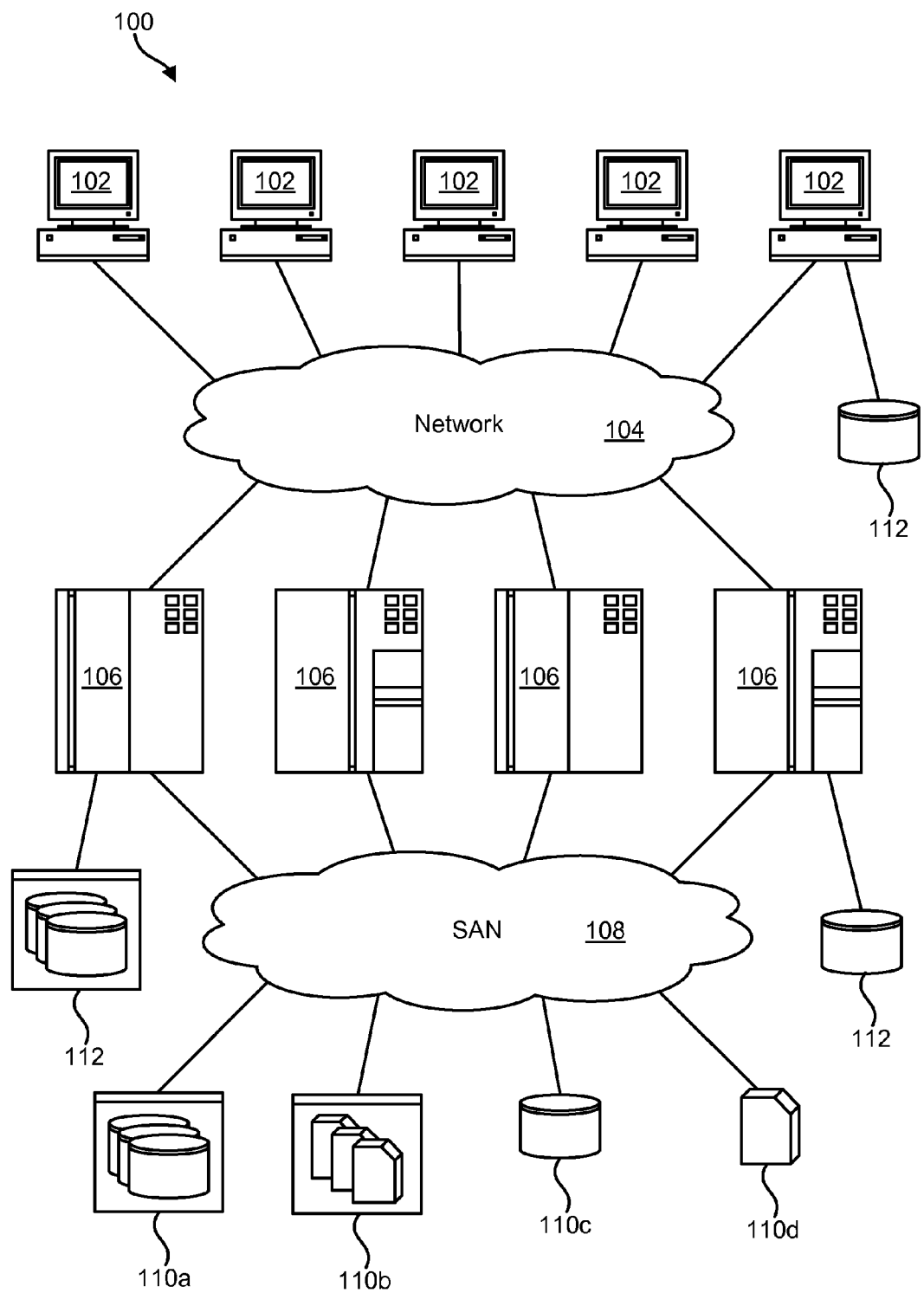
FIG. 1 is a high-level block diagram of one example of a network architecture where an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented by way of example and not limitation. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may be used to implement a tiered storage architecture that may benefit from the data migration techniques disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may be used to implement a tiered storage architecture that may benefit from the data migration techniques disclosed herein.

Figure 2:
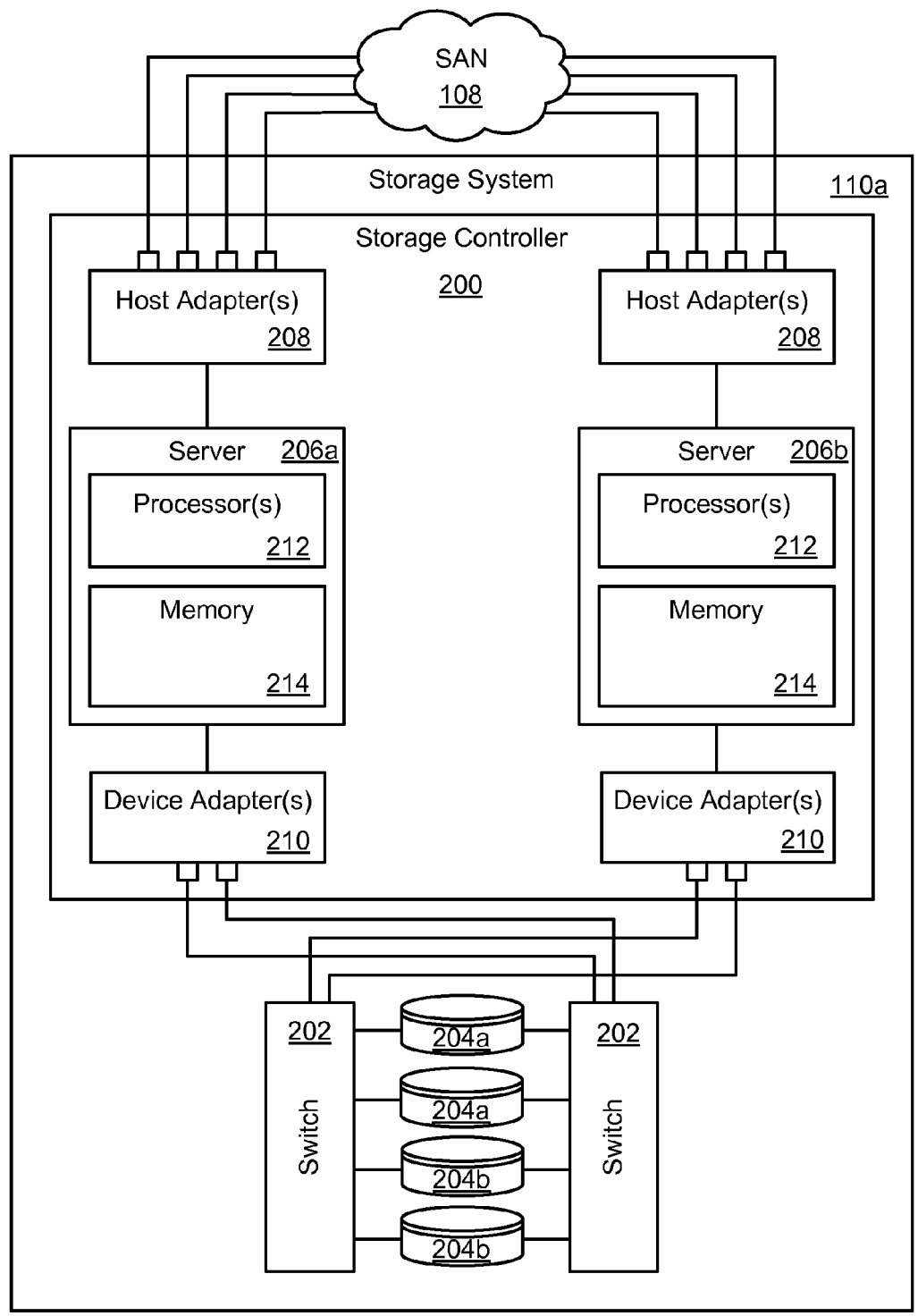
FIG. 2 is a high-level block diagram showing one example of a storage system where an apparatus and method in accordance with the invention may be implemented.

Referring to FIG. 2, one embodiment of a storage system 110a containing an array of storage devices 204 (e.g., hard-disk drives 204a and/or solid-state drives 204b) is illustrated. The internal components of the storage system 110a are shown since apparatus and methods in accordance with the invention may be implemented within such a storage system 110a, although they are not limited to implementation in such a storage system 110a. As shown, the storage system 110a includes a storage controller 200, one or more switches 202, and one or more storage devices 204, such as hard-disk drives 204a or solid-state drives 204b (e.g., flash-memory-based drives 204b). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to the IBM DS8000™ enterprise storage system 110a, but may be implemented in any comparable or analogous storage system 110 regardless of the manufacturer, product name, or components or component names associated with the storage system 110. Any storage system 110 that could benefit from the apparatus and methods disclosed herein is deemed to fall within the scope of the invention. Thus, the IBM DS8000™ is presented only by way of example and is not intended to be limiting.

Figure 4:
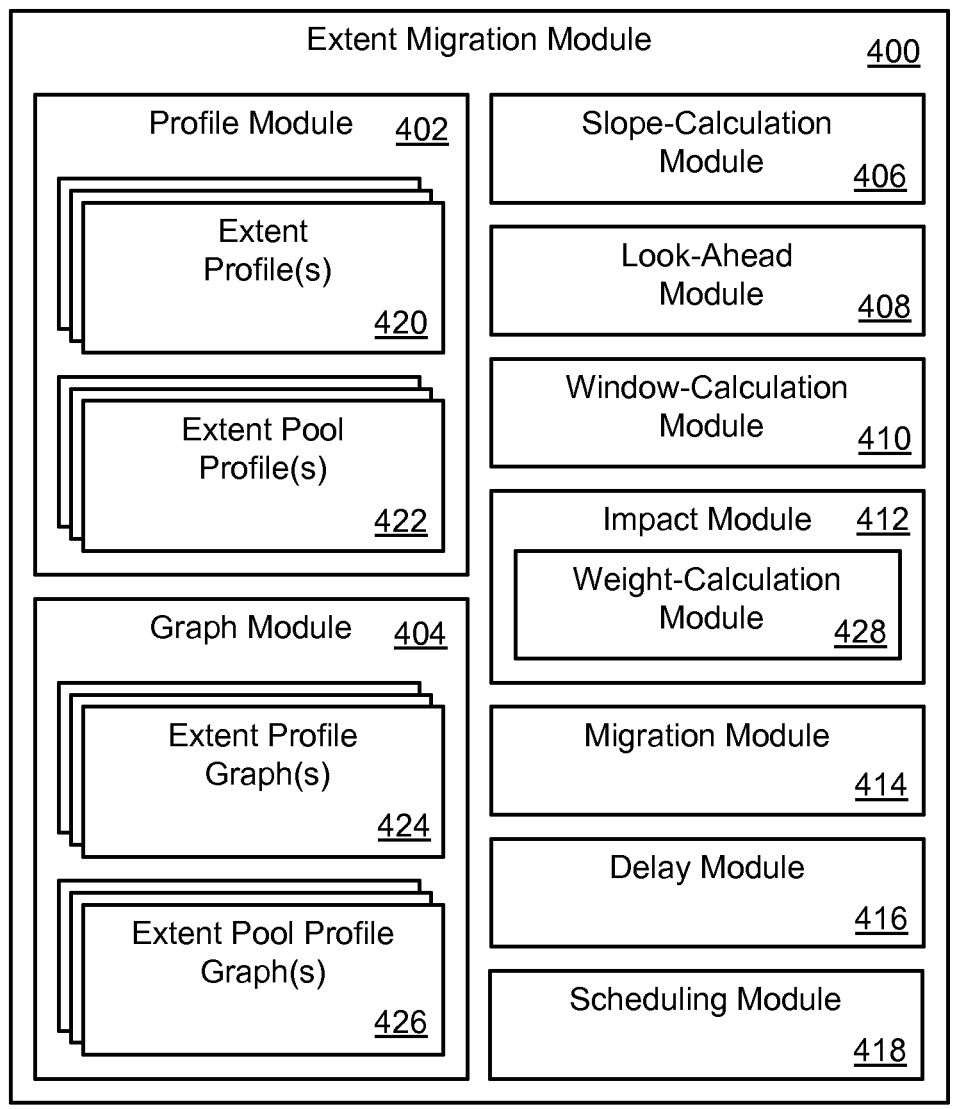
FIG. 4 is a high-level block diagram showing various modules that may be used to implement an apparatus and method in accordance with the invention.

In selected embodiments, each server 206 in the storage system 110a includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204. The volatile memory and non-volatile memory 214 may also store software modules (as shown in FIG. 4) for efficiently migrating extents between extent pools of the storage system 110a. These modules will be described in more detail in association with FIG. 4.

Figure 3:
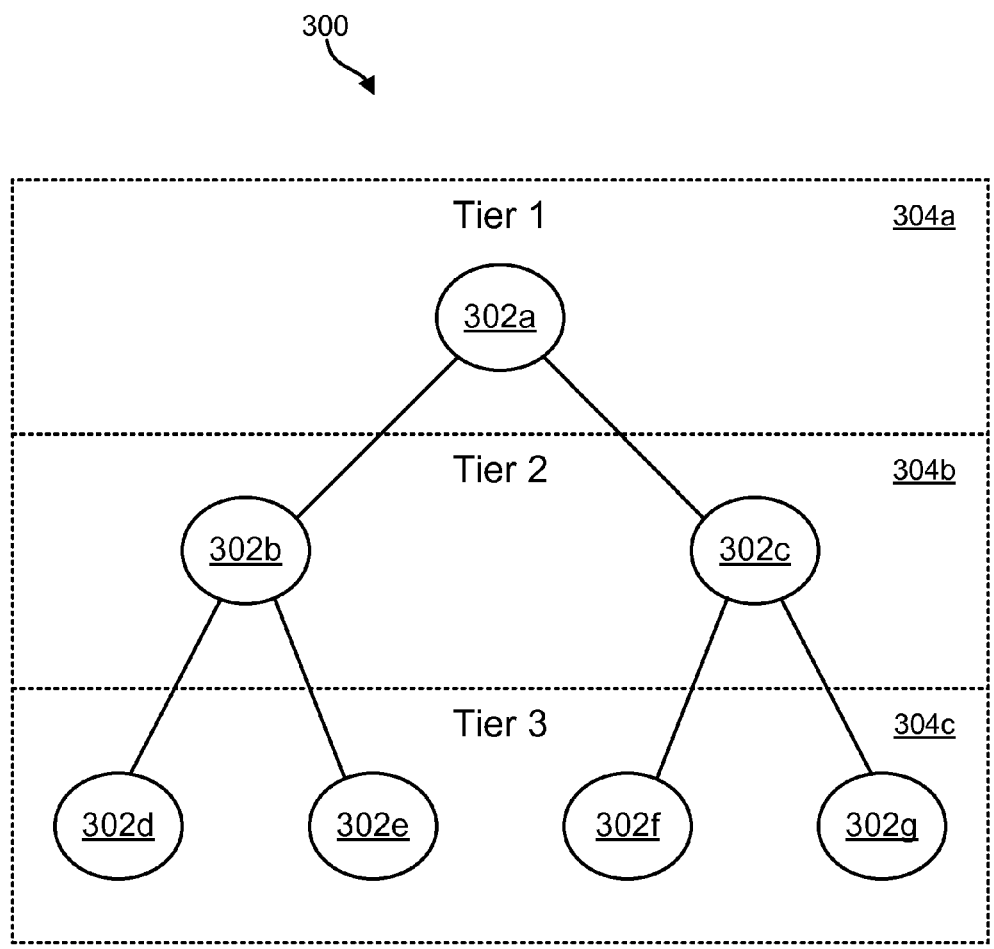
FIG. 3 is a high-level block diagram of extent pools organized into a multi-tiered (i.e., hierarchical) storage architecture.

Referring to FIG. 3, one example of a multi-tiered (i.e., hierarchical) storage architecture 300 comprising multiple extent pools 302 is illustrated. In certain embodiments, the storage architecture 300 is established in a single storage system 110, such as the storage system 110a illustrated in FIG. 2. In other embodiments, the storage architecture 300 is distributed across multiple storage systems 110. Each tier 304 of the storage architecture 300 may include storage devices 204 of differing performance and/or cost. For example, a first tier 304a may contain faster storage devices 204, such as solid state drives, a second tier 304b may contain slower and less expensive storage devices 204 such as hard disk drives, and a third tier 304c may contain yet slower and less expensive storage devices such as tape drives. The tiered storage architecture 300 in FIG. 3 is provided only by way of example and is not intended to be limiting. In other embodiments, the tiered storage architecture 300 includes more or fewer tiers 304 than those illustrated, or utilizes different storage media types in each tier 304.

Each of the tiers 304 may contain one or more extent pools 302, each of which may contain one or more extents. For the purposes of this disclosure, the term "extent" is used to refer to a contiguous block of bits or bytes in an extent pool 302. In certain embodiments, the size of each extent in the tiered storage architecture 300 is uniform. An extent pool 302 may be contained on a single storage device 204 or may span multiple storage devices 204 (such as when organized as a RAID).

Extents in the hierarchical storage architecture 300 may be migrated between the extent pools 302 to ensure that the extents are optimally placed within the storage architecture 300. For example, data that is "hot" (i.e., accessed frequently) may be moved to or retained in higher-level extent pools 302a, while data that is "cold" (i.e., accessed infrequently) may be moved to or retained in lower-level extent pools 302d-g. Because the "hotness" or "coldness" of the data in the extent pools 302 may change over time, extents may be continually migrated between the storage tiers 304 as the hotness or coldness changes.

Referring to FIG. 4, as previously mentioned, many conventional implementations for migrating extents within tiered storage architectures 300 address why and where extents need to be migrated to improve performance. However, the decision as to when to migrate extents is either not addressed or not given sufficient attention. The decision concerning when to migrate an extent has large implications on performance. For example, migrating extents when storage devices are processing large amounts of I/O can significantly reduce the storage devices' I/O performance. This can be self-defeating since the goal of the migration may be to improve I/O performance.

In selected embodiments in accordance with the invention, an extent migration module 400 may be provided to more effectively address when to migrate extents between extent pools 302. Such a module 400 may be implemented in a host system 106, a storage system 110, or be distributed across multiple host systems 106 and/or storage systems 110. The extent migration module 400 may be implemented in hardware, software or firmware executable on hardware, or a combination thereof. The modules and accompanying data structures are presented only by way of example and are not intended to be limiting. Indeed, alternative embodiments may include more or fewer modules or data structures than those illustrated, or the modules or data structures may be organized differently. Furthermore, it should be recognized that, in some embodiments, the functionality of some modules may be broken into multiple modules or, conversely, the functionality of several modules may be combined into a single module or fewer modules.

As shown, the extent migration module 400 includes a profile module 402, a graph module 404, a slope-calculation module 406, a look-ahead module 408, a window-calculation module 410, an impact module 412, a migration module 414, a delay module 416, and a scheduling module 418.

A profile module 402 may be configured to maintain a data access profile 420, 422 for extents and extent pools 302 residing in the tiered storage architecture 300. In certain embodiments, this may be accomplished by periodically (e.g., every minute, five minutes, hour, etc.) taking a snapshot of the data access characteristics of the extents and extent pools 302 in the tiered storage architecture 300. For example, if the period is five minutes, at every five minute interval, the profile module 402 may determine how many I/Os (reads and/or writes) were performed on an extent since the previous measurement (i.e., five minutes ago). This data may be used to calculate the average data access rate over the five minute period. By taking these measurements (or "snapshots") every five minutes, changes to the data access rate of the extent may be tracked over time. This may be used to monitor the "hotness" or "coldness" of the data in the extent over time. By summing the data access characteristics for each extent in an extent pool 302 at each time interval, the profile module 402 may also maintain a data access profile 422 for each extent pool 302 in the tiered storage architecture 300.

Figure 5:
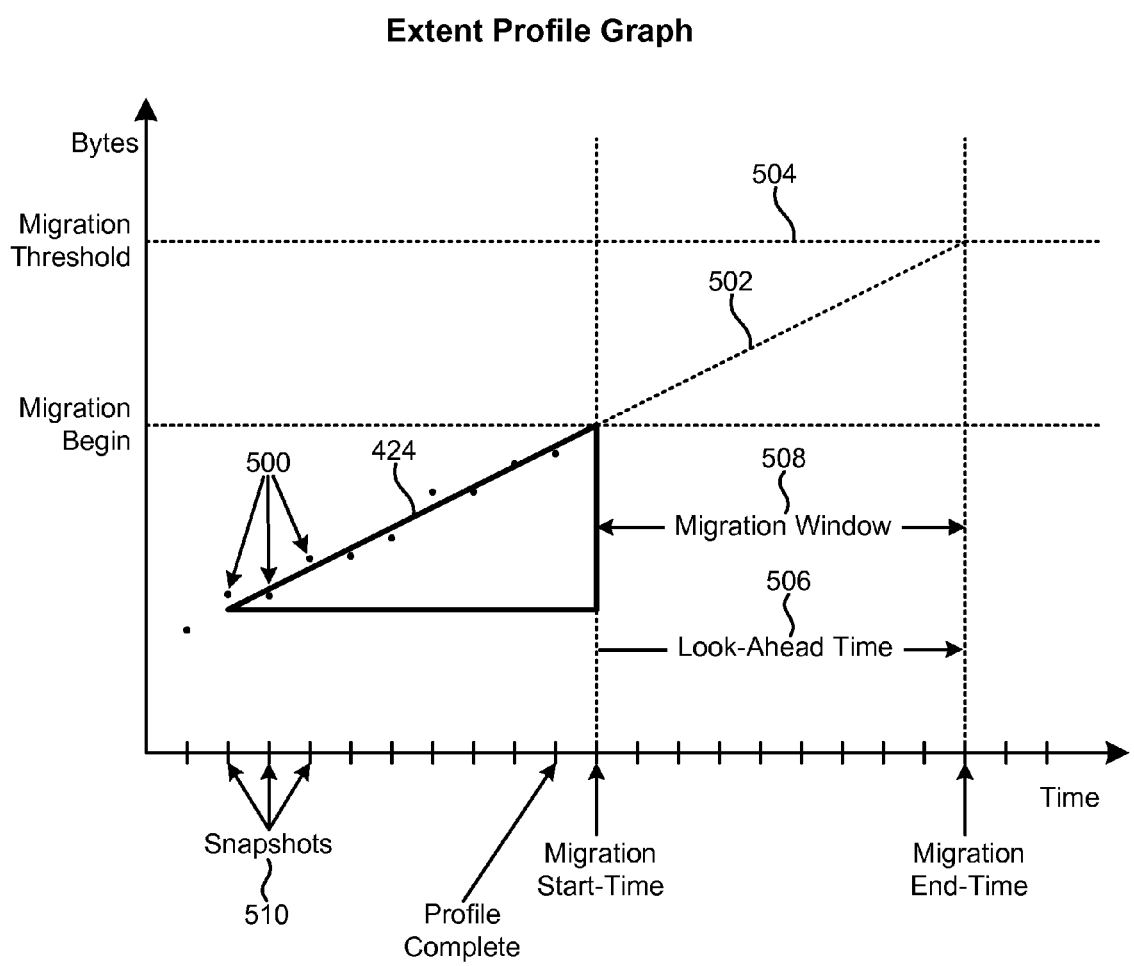
FIG. 5 shows one example of an extent profile graph created for an extent.

Using the extent profiles 420, a graph module 404 may generate an extent profile graph 424 for each extent in the tiered storage architecture 300. FIG. 5 shows one example of an extent profile graph 424. The data points 500 represent snapshots 510 of the number of bytes accessed in an extent since the previous time interval. Using these data points 500, the graph module 404 generates an extent profile graph 424 that indicates the general trend in the access rates for the extent. In selected embodiments, this graph 424 is a linear regression line that best fits the data 500. In other embodiments (not shown), a non-linear graph 424, such as a best-fit curve, may be used to approximate the trend in the data access rates. The extent profile graph 424 may be used to predict the data access rates for an extent into the future (as shown by the dotted line 502).

Figure 6:
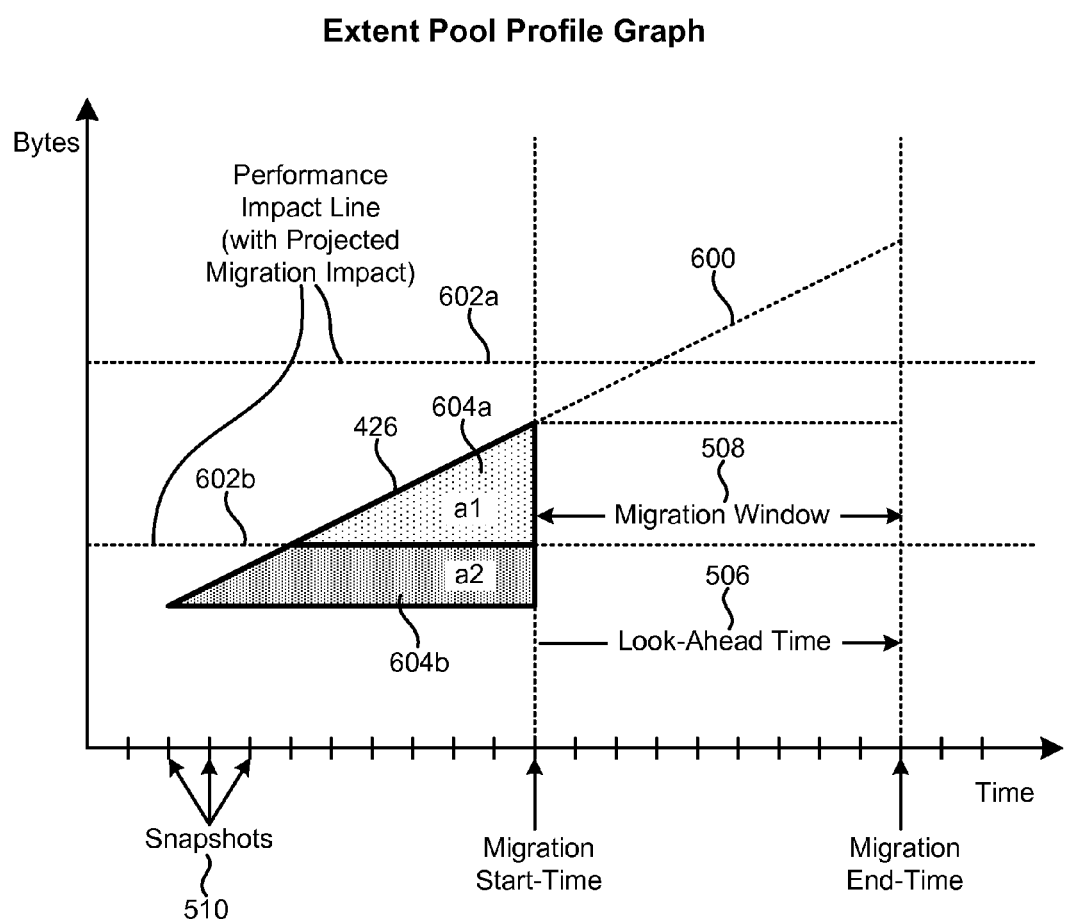
FIG. 6 shows one example of an extent pool profile graph created for an extent pool.

Using the extent pool profiles 422, the graph module 404 may also generate extent pool profile graphs 426 for extent pools 302 in the tiered storage architecture 300. One example of an extent pool profile graph 426 is illustrated in FIG. 6. Like the extent profile graph 424, the extent pool profile graph 426 shows the general trend in data access rates for an extent pool 302. As will be explained in more detail hereafter, when determining whether to migrate an extent, an extent pool profile graph 426 may be generated for both the source extent pool 302 and destination extent pool 302. As will be further explained, the source and destination extent pool graphs 426 may be useful to calculate the performance impact on the source and destination extent pools if an extent is migrated during a specific migration window 508. Like an extent profile graph 424, an extent pool profile graph 426 may be a linear or non-linear regression line that best fits the data. An extent pool profile graph 426 may also be used to predict the data access rates for an extent pool 302 into the future (as shown by the dotted line 600).

Once an extent profile graph 424 is generated for an extent, a slope-calculation module 406 determines the slope of the graph 424. Using this slope, a look-ahead module 408 determines whether the graph 424 will reach a migration threshold 504 within a specified "look-ahead" time 506 (See FIG. 5). For the purposes of this description, the migration threshold 504 is a threshold wherein an extent's data access rates are deemed to have reached a sufficient level that the extent should be promoted/demoted from one extent pool 302 to another, such as from a slower extent pool 302 to a faster extent pool 302. In essence, the look-ahead module 408 attempts to anticipate or predict when an extent will reach the migration threshold 504 so that the extent can ideally be migrated before reaching the threshold 504. This avoids migrating the extent at a time when it is receiving a large amount of I/O. Since trying to predict an extent's data access rates too far into the future may introduce uncertainty and thus inaccuracy, a maximum look-ahead time 506 is established.

Once the look-ahead module 408 determines that an extent profile graph 424 will reach a migration threshold 504 within the look-ahead time 506, a window-calculation module 410 determines a migration window 508 that allows the extent to be migrated from a source extent pool 302 to a destination extent pool 302 within the look-ahead time 506 and prior to reaching the migration threshold 504. Once the migration window 508 is determined, an impact module 412 determines what the overall performance impact will be on the source and destination extent pools 302 if the extent is migrated during the migration window 508. In selected embodiments, the impact module 412 includes a weight-calculation module 428 to determine a weight for each of the source and destination pools 302. The value of the weights may be based on the storage architecture 300 and the relationship between the source and destination pools 302. The weight values may vary based on whether an extent pool 302 is a source or destination pool, whether an extent is being demoted or promoted from the extent pool 302 (i.e., whether the extent is being read from or written to the extent pool 302), and/or the performance characteristic of the extent pool 302. In selected embodiments, the weights are normalized such that:

$$S_f + D_f = 1$$

where $S_f$ is the pool significance factor (i.e., weight) for the source extent pool 302 and $D_f$ is the pool significance factor (i.e., weight) for the destination extent pool 302.

The impact module 412 may also calculate the individual performance impacts on the source extent pool 302 and destination extent pool 302 if the extent is migrated during the migration window 508. For example, referring again to FIG. 6, for each of the source extent pool 302 and destination extent pool 302, the impact module 412 may establish a performance impact line 602a above which the extent pool's performance is impacted and below which the performance is not significantly impacted (The impact line 602b is the same as impact line 602a but is shown lower to illustrate where it intersects the graph 426, which is used to predict future data access rates). The area 'a1' above the impact line 602b represents the area where performance is impacted and the area 'a2' below the impact line 602b represents the area where performance is not impacted.

Using the weight values and impact values for the source extent pool 302 and destination extent pool 302, the impact module 412 calculates the overall performance impact that would occur by migrating the extent during the migration window 508. In selected embodiments, the overall performance impact may be calculated from the following function:

$$\text{Migrate}(S,D) = S_f \times (S_{a2} - S_{a1}) + D_f \times (D_{a2} - D_{a1})$$

where $S_{a1}$ is the area 604a where performance is impacted for the source extent pool 302, $S_{a2}$ is the area 604b where performance is not impacted for the source extent pool 302, $D_{a1}$ is the area 604a where performance is impacted for the destination extent pool 302, and $D_{a2}$ is the area 604b where performance is not impacted for the destination extent pool 302.

If the overall performance impact calculated using the function Migrate(S,D) is below a designated impact threshold (e.g., 0 or other suitable value), the migration module 414 will migrate the extent during the migration window 508. If, on the other hand, the overall performance impact is equal to or above the impact threshold, a delay module 416 may delay the migration of the extent and the extent will not be migrated during the migration window 414. If delayed, the extent may be re-evaluated at a later time to determine a more suitable migration window or determine if it should be migrated at all. Alternatively, a scheduling module 418 may schedule the extent for migration at a later time using some other scheduling algorithm. For example, the scheduling module 418 may schedule the extent for migration during off-peak hours or other suitable time periods.

It should be noted that various constants or thresholds disclosed herein, such as the migration threshold 504, performance impact line 602, maximum look-ahead time 506, and weight values $S_f$, $D_f$ may be calculated and determined empirically, such as by testing the storage architecture 300. Because different storage architectures 300 may utilize different types of storage media, hardware, or software that exhibit different performance characteristics, the constants and thresholds may vary for different storage architectures 300.

Figure 7:
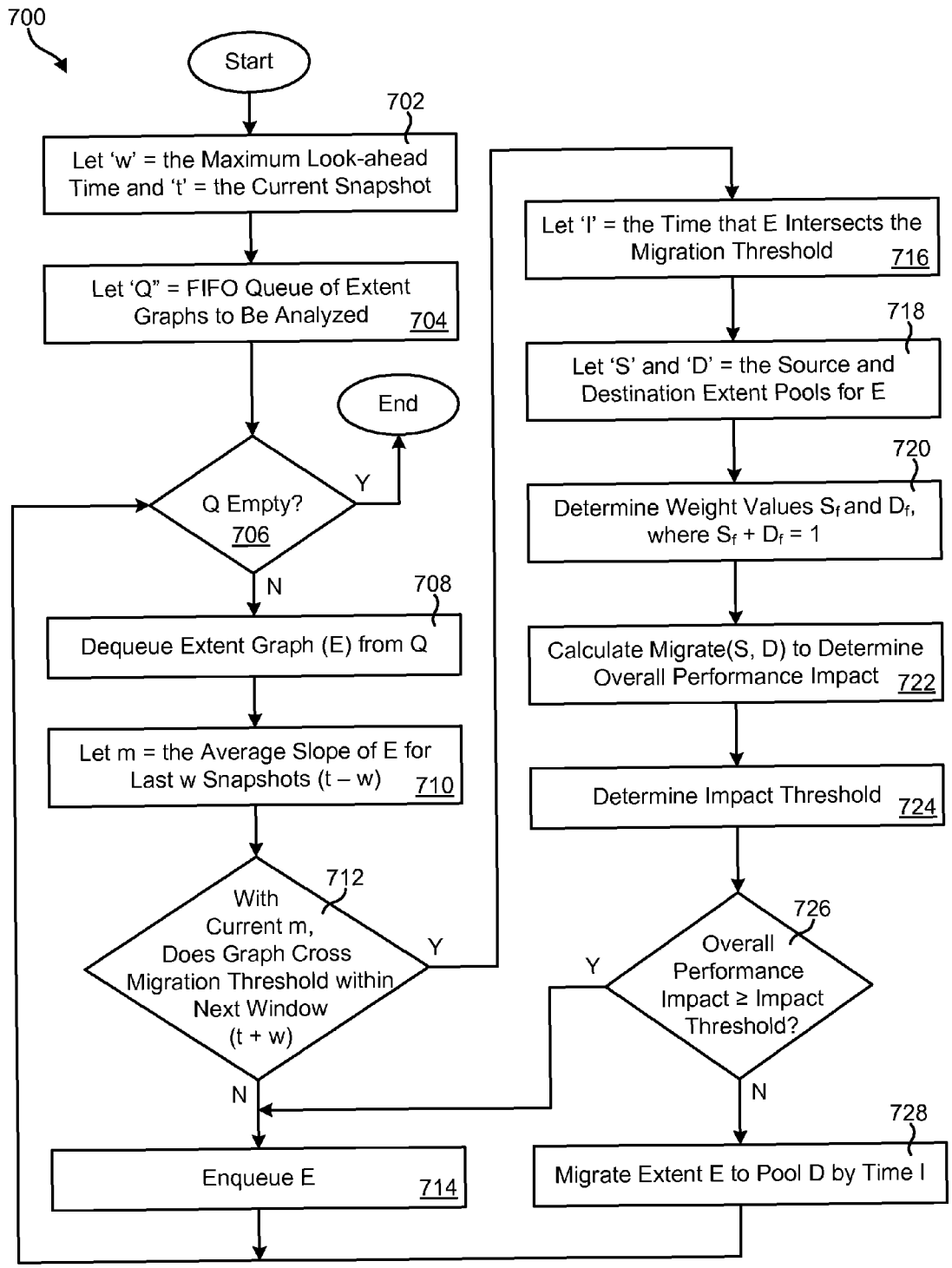
FIG. 7 is a flow diagram showing one embodiment of a method for efficiently migrating extents between extent pools in a tiered storage architecture.

Referring to FIG. 7, one embodiment of a method 700 for efficiently migrating extents between extent pools 302 in a tiered storage architecture 300 is illustrated. In certain embodiments, the method 700 is executed by the extent migration module 400 although the extent migration module 400 may also execute other methods. As shown, the method 700 initially lets 702 'w' equal the maximum look-ahead time 506 and 't' equal the current snapshot 510. The method 700 lets 704 'Q' be a FIFO queue of extent graphs 424 to be analyzed. The method 700 then determines 706 whether the queue is empty. If not empty, the method 700 dequeues 708 an extent graph 424 from the queue and calculates 710 the slope of the extent graph 424, where the slope is the average slope of the extent graph 424 for the last w snapshots (t−w).

Using this slope, the method 700 determines 712 whether the extent graph 424 crosses the migration threshold 504 within the next window (t+w). If not, the method 700 enqueues 714 the extent graph 424 for analysis at a later time. If the extent graph 424 does cross the migration threshold 504 within the next window (t+w), the method 700 lets 716 'I' be the time that the extent graph 424 intersects the migration threshold 504. The method 700 also lets 718 'S' and 'D' be the source and destination extent pools 302 for the extent graph 424. The method 700 then determines 720 the weight values for the source and destination extent pools 302.

Using the weight values, the method 700 calculates 722 the overall performance impact using the Migrate(S,D) function. The method 700 also determines 724 the impact threshold. The method 700 then compares 726 the overall performance impact with the impact threshold. If the overall performance impact is greater than or equal to the impact threshold, the method 700 does not migrate the extent during the migration window 508 but rather enqueues 714 the extent graph 424 for analysis at a later time. If, on the other hand, the overall performance impact is less than the impact threshold, the method 700 migrates 728 the extent to the destination extent pool 302 during the migration window 508 and prior to reaching the migration threshold 504.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, the blocks may sometimes be executed in reverse, or the blocks may be executed in an alternate order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product for efficiently migrating extents between extent pools in a tiered storage architecture, the computer program product comprising a non-transitory computer-readable storage medium having computer-usable program code embodied therein, the computer-usable program code comprising:
    computer-usable program code to maintain a data access profile for an extent over a period of time;
    computer-usable program code to generate, from the data access profile, an extent profile graph predicting a number of data accesses per time period for the extent into the future;
    computer-usable program code to determine the slope of the extent profile graph;
    computer-usable program code to determine, by evaluating the slope, whether the extent will reach a migration threshold within a specified look-ahead time, the migration threshold defining a threshold number of data accesses per time period; and
    computer-usable program code to determine a migration window that allows the extent to be migrated from a source extent pool to a destination extent pool prior to reaching the migration threshold.

2. The computer program product of claim 1, further comprising computer-usable program code to determine the overall performance impact on the source extent pool and destination extent pool during the migration window.

3. The computer program product of claim 2, further comprising computer-usable program code to migrate the extent during the migration window if the overall performance impact is below a designated impact threshold.

4. The computer program product of claim 3, further comprising computer-usable program code to schedule the extent for migration at another time if the overall performance impact is above a designated impact threshold.

5. The computer program product of claim 2, wherein determining the overall performance impact further comprises calculating weight values for the source extent pool and destination extent pool based at least in part on the performance characteristics of the source extent pool and destination extent pool, respectively.

6. The computer program product of claim 5, wherein determining the overall performance impact further comprises determining the value of a function, wherein inputs to the function include the individual performance impacts of the source extent pool and destination extent pool, adjusted by their weight values.

7. The computer program product of claim 1, wherein maintaining the data access profile comprises periodically taking snapshots of data access rates of the extent.

8. The computer program product of claim 7, wherein generating the extent profile graph comprises using regression techniques on the snapshots to generate the extent profile graph.

9. An apparatus for efficiently migrating extents between extent pools in a tiered storage architecture, the apparatus comprising:
    a plurality of modules implemented in at least one of hardware and software operating on hardware, the modules comprising:
        a profile module to maintain a data access profile for an extent over a period of time;
        a graph module to generate, from the data access profile, an extent profile graph predicting a number of data accesses per time period for the extent into the future;
        a slope-calculation module to determine the slope of the extent profile graph;
        a look-ahead module to determine, by evaluating the slope, whether the extent will reach a migration threshold within a specified look-ahead time, the migration threshold defining a threshold number of data accesses per time period; and
        a window-calculation module to determine a migration window that allows the extent to be migrated from a source extent pool to a destination extent pool prior to reaching the migration threshold.

10. The apparatus of claim 9, further comprising an impact module to determine the overall performance impact on the source extent pool and destination extent pool during the migration window.

11. The apparatus of claim 10, further comprising a migration module to migrate the extent during the migration window if the overall performance impact is below a designated impact threshold.

12. The apparatus of claim 11, further comprising a scheduling module to schedule the extent for migration at another time if the overall performance impact is above a designated impact threshold.

13. The apparatus of claim 10, further comprising a weight-calculation module to calculate weight values for the source extent pool and destination extent pool based at least in part on the performance characteristics of the source extent pool and destination extent pool, respectively.

14. The apparatus of claim 13, wherein the impact module is further configured to determine the overall performance impact by determining the value of a function, wherein inputs to the function include the individual performance impacts of the source extent pool and destination extent pool, adjusted by their weight values.

15. The apparatus of claim 9, wherein the profile module is configured to maintain the data access profile by periodically taking snapshots of data access rates of the extent.

16. The apparatus of claim 15, wherein the graph module is configured to generate the extent profile graph by using regression techniques on the snapshots.

* * * * *